US008615161B2

(12) United States Patent
Corry et al.

(10) Patent No.: US 8,615,161 B2
(45) Date of Patent: Dec. 24, 2013

(54) OPTIMIZING RECORDING SPACE IN DIGITAL VIDEO RECORDING OF TELEVISION PROGRAMS CONTAINING COMMERCIALS

(75) Inventors: Kevin M Corry, Austin, TX (US); Mark A Peloquin, Austin, TX (US); Steven L Pratt, Austin, TX (US); Karl M Rister, Austin, TX (US); Andrew M Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 13/310,082

(22) Filed: Dec. 2, 2011

(65) Prior Publication Data

US 2013/0142498 A1    Jun. 6, 2013

(51) Int. Cl.
*H04N 9/80* (2006.01)
(52) U.S. Cl.
USPC .......... 386/250; 386/249; 386/251; 386/294; 386/295
(58) Field of Classification Search
USPC .......................... 386/250, 249, 251, 294, 295
See application file for complete search history.

(56) References Cited

U.S. PATENT DOCUMENTS

| | | | | |
|---|---|---|---|---|
| 4,430,676 A | * | 2/1984 | Johnson | 360/13 |
| 5,716,273 A | * | 2/1998 | Yuen | 463/29 |
| 7,062,158 B1 | * | 6/2006 | Ayaki | 386/248 |
| 7,089,575 B2 | * | 8/2006 | Agnihotri et al. | 725/20 |
| 7,212,730 B2 | * | 5/2007 | Boston et al. | 386/291 |
| 7,765,235 B2 | | 7/2010 | Day et al. | |
| 7,848,618 B2 | * | 12/2010 | Potrebic et al. | 386/344 |
| 2004/0175094 A1 | * | 9/2004 | Mautner et al. | 386/46 |
| 2004/0221303 A1 | * | 11/2004 | Sie et al. | 725/29 |
| 2006/0013556 A1 | * | 1/2006 | Poslinski | 386/46 |
| 2007/0101373 A1 | * | 5/2007 | Bodlanender et al. | 725/86 |
| 2008/0022296 A1 | * | 1/2008 | Iggulden | 725/22 |
| 2008/0310408 A1 | * | 12/2008 | Thompson et al. | 370/386 |
| 2009/0304357 A1 | * | 12/2009 | Rashkovskiy et al. | 386/95 |
| 2010/0115575 A1 | | 5/2010 | Yu et al. | |
| 2010/0179865 A1 | * | 7/2010 | Lundqvist et al. | 705/14.4 |

* cited by examiner

*Primary Examiner* — Helen Shibru
(74) *Attorney, Agent, or Firm* — J. B. Kraft; David A. Mims

(57) ABSTRACT

Recording television programs for future playback by enabling the user to record a plurality of programs that have sequential units of commercial content. There is sequential sensing for commercial content units. When a commercial content unit is reached, it is removed for separate storage. A determination is made as to whether the removed commercial content unit is the same as a previous commercial content unit that has been removed. Any previous commercial unit that has been removed has been stored in a file and a pointer to the file inserted in place of the commercial in the sequential stream of the television program being recorded. Thus, if the removed commercial unit has the same content, i.e. is a repeat of a previous commercial, the inserted pointer will point to the file of the previous commercial.

8 Claims, 5 Drawing Sheets

OPTIMIZING RECORDING SPACE IN DIGITAL VIDEO RECORDING OF TELEVISION PROGRAMS CONTAINING COMMERCIALS

TECHNICAL FIELD

The present invention relates to computer controlled displays including television displays and particularly the handling of commercials in television programs recorded for future play back in television systems controlled through Digital Video Recorders (DVRs).

BACKGROUND OF RELATED ART

Current technology has been marked by the technological convergence of the data processing industry with the consumer electronics industry. An area where this relationship has been advantageous is that of digital video recording. This has resulted in the emergence of a set top box based upon the DVRs. A description of the PVRs and DVRs and like digital video recorders and their increasing consumer functions as computer controlled "engines" in television set top boxes may be found in: IEEE Spectrum periodical, (IEEE Inc.), New York, N.Y., July 2002, at pp. 26-31. The DVR has many advantages, particularly ease of use to the users in the advance scheduling of television programs to be subsequently sequentially recorded. However, extensive usage of the DVR has also given rise to a set of problems involving the viewer, the broadcasting organizations that broadcast the television programs and the sponsors or hosts of the commercial content that is, of course, embedded in such television programs.

The background of this television industry should be briefly reviewed in order to better understand the problems and issues. When television was first introduced for mass media entertainment and education, the television program content was broadcast essentially line of sight antenna to antenna. The content was, of course, supported and paid for by commercial sponsors or hosts who paid for or created the content in order to have opportunities to interleave or embed periodic commercial content into the television program. This was the return benefit that the sponsor or host received for his support of the television program. As the demand for television programming rapidly increased, traditional line of sight antenna broadcasting had to be supplemented and replaced to a very great extent by cable and satellite services. The frequency channels that the Government made available for the presentation of programming by respective television stations also rapidly increased. This led to television service providers that obtained and consolidated the programs transmitted by the respective television stations to be presented to viewers via government designated frequency channels. The original television stations would transmit at their assigned frequencies either by direct line of sight, cable or through satellites. The television service providers then received the respective program channel signals and consolidated all the data in such transmissions into an integrated data stream representative of an extensive set of television programs being presented on corresponding channels into an unitary data stream that was then compressed and transmitted to the television service provider's subscribers either via satellite or cable. This integrated data stream was encrypted to protect the provider's revenues. The viewer could then receive this integrated data stream and extract any "live" or real-time television program through his television receiver or frequency channel tuner. The provider system would extract the appropriate television program data directly from the real-time satellite or cable service provider integrated data stream. The extracted program data would be decrypted and decompressed and the television program would be displayed on a real-time basis on the television set display.

Where the user wished to record a particular television program for future viewing, it would be extracted at its scheduled viewing period from the integrated data stream in the same manner as described, decrypted, decompressed and recorded on disk drives (DVRs). Individual programs on their respective channels could still be recorded on a real-time basis by first extracting, decrypting and decompressing.

This, of course, resulted in the current state of the DVR or PVR industry where the user, with an appropriate DVR, could record dozens of broadcast and transmitted television programs for future viewing merely by entering its unique identifier. Despite all of the described advances in the presentation of television programming to the viewers, the state of the industry is such that television programs are still, to a large part, produced for the television sponsors or hosts who still interleave commercial content into the broadcast television programs. In addition, greater and greater numbers of viewers are viewing their television programming from their personal recordings.

It naturally has developed that many are bothered by commercials for two reasons: they interrupt and take up a great amount of recorded content; and commercials consume a substantial amount of recording DVR space. Television commercials generally consume about 25% of DVR storage space and, in the case of major sports events, almost 50% of recording space. There have been various implementations addressing the preservation and display of the sponsor's commercials. The present invention addresses how recorded DVR space may be optimized with respect to recorded commercials.

SUMMARY OF THE PRESENT INVENTION

The present invention offers an implementation that minimizes recording needed for commercials through recognizing that the commercials on the same or different recorded television programs may be repetitive, i.e. the same commercial content may be repeated several times on a television program.

Accordingly, this invention provides a method of recording television programs for future playback that enables the user to record a plurality of programs that have sequential units of commercial content. There is sequential sensing for commercial content units. When a commercial content unit is reached, it is removed for separate storage. A determination is made as to whether the removed commercial content unit is the same as a previous commercial content unit that has been removed. Any previous commercial unit that has been removed has been stored in a file and a pointer to the file inserted in place of the commercial in the sequential stream of the television program being recorded. Thus, if the removed commercial unit has the same content, i.e. is a repeat of a previous commercial, the inserted pointer will point to the file of the previous commercial. On the other hand if the removed commercial is not a repeat, then the commercial unit content is stored in a new file and the inserted point will point to the new file. It follows that during playback when a pointer is reached, the commercial unit in the file pointed to will be played.

In accordance with an aspect of this invention, the viewer is enabled to record a plurality of television programs and commercial content units in different television programs have the same content. In such a situation, pointers in the different television programs point to the same recorded commercial unit file.

In accordance with a further aspect of the invention, a count is incremented, during recording of television programs, each time each of the stored commercial content files is pointed to. Then, when a view selects to delete a recorded television program, the program being deleted is first scanned for commercial units and each time each of the stored commercial content files is pointed to, the counter for that file is deleted by "1". With such a counting implementation, each stored commercial content file is deleted when the count for the file reaches zero.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
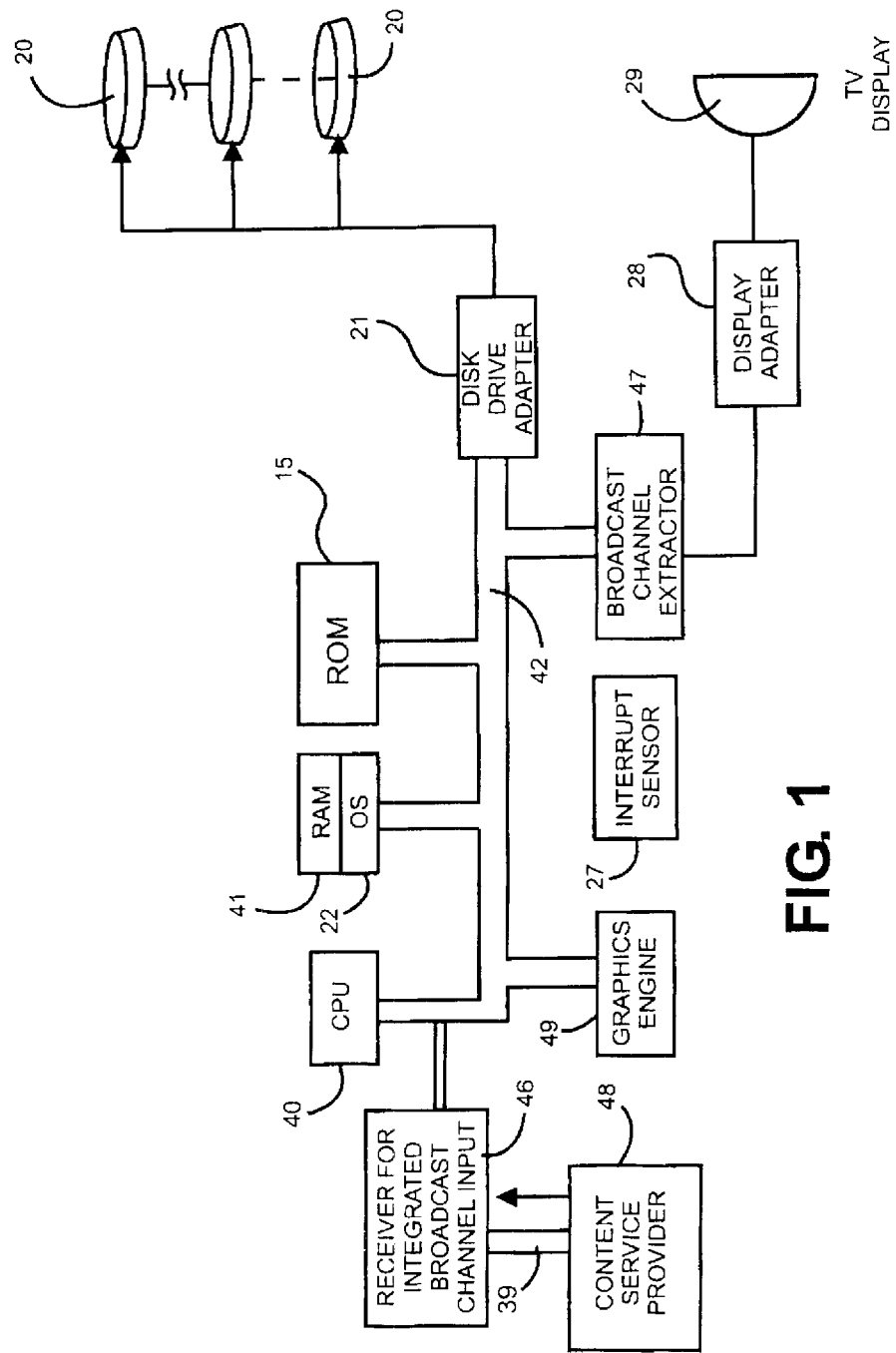
FIG. 1 is a generalized view of how a system used in the present invention is organized around a DVR.

With reference to FIG. 1, there will be described how the present invention may be implemented on any apparatus providing computer control of a television set so that the control method and programs of this invention may be operated with the equipment. The receiver 46 at the viewer's site receives the content input 39 from the service provider 48. The apparatus shown connected to receiver 46 may be conveniently housed in a television set top box or integrated within a unitary television set.

The operations involved in the present invention are controlled by a data processing system under the control of a central processing unit 40, which, in turn, is interconnected to various other components by system bus 42. An operating system (OS) 22 that runs on processor 40 provides control and is used to coordinate the functions of the various components of the control system. The OS 22 is stored in Random Access Memory (RAM) 41. The control programs for the functions, including those for recording for future playback on the television sets of the present invention may be permanently stored in Read Only Memory (ROM) 13 and moved into and out of RAM to perform their respective functions. In the normal operation for real-time television program playing, the integrated incoming data stream, under CPU control, is applied to broadcast channel extractor 47 that extracts the data representative of the television program scheduled for the channel that the user has selected on a tuner (not shown) and applies the extracted data to a conventional television display adapter 28 to be displayed on the user's television set 29.

When the incoming unitary data stream is to be recorded on a DVR, the signal is processed through a disk drive adapter 21 and stored on disk drives 20. In the conventional operation of a DVR, the television program scheduled for a given channel at a given time is extracted by extractor 47, in response to interrupt sensor and then stored on a disk drive 20 provided on the DVR. This individual program would be recorded and, thus, stored on the disk drive either in response to advance scheduling by the user for such a recording in accordance with the present invention. The television recorded programs are stored on disk drives 20 as are the files created for removed commercial units. During playback, the recorded television programs are accessed from disk drives 20 and applied to display 29 through display adapter 28. The previously described counters associated with the files for commercial units may be any standard counters in CPU 40.

Figure 2:
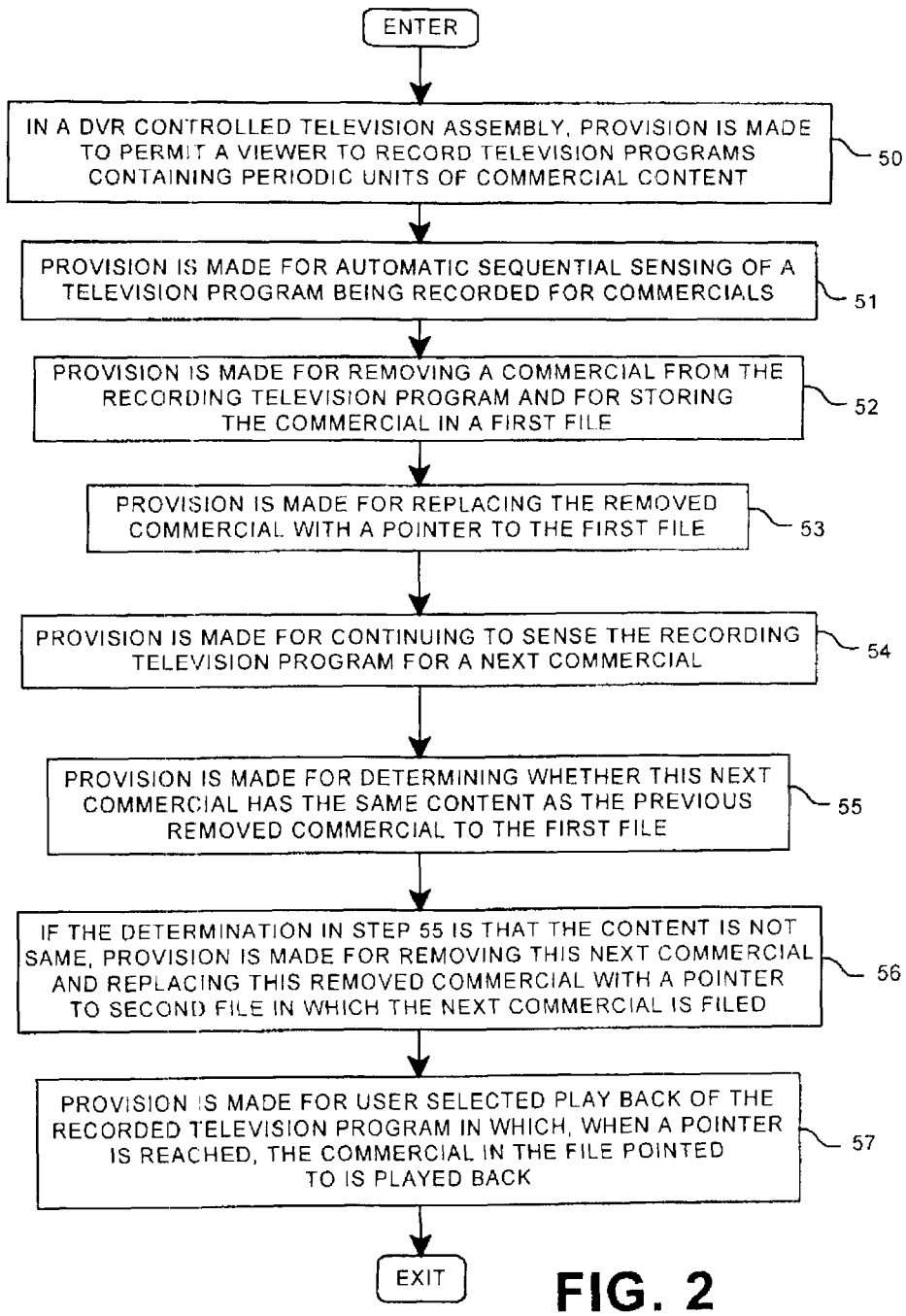
FIG. 2 is a flowchart describing how the implementation system of the present invention provides for the optimization of DVR storage space for repetitive commercials.

Now, with reference to the programming shown in FIG. 2, there will be described how the method and programs of the present invention are set up. In a DVR controlled television assembly, provision is made to enable a viewer to record television programs containing periodic commercial content units, step 50. Provision is made for automatic sequential sensing of a television program being recorded for the commercial units, step 51. Provision is made for removing a commercial unit being recorded and for storing the commercial in a first file, step 52. Provision is made for replacing the removed commercial file from the television program stream with a pointer to the first file, step 53. Provision is made for continuing the sensing for a next sequential commercial, step 54. Provision is made for determining whether this next commercial has the same content as the previous commercial removed to the first file, step 55. Now, if the determination in step 55 is that the content is not the same, then provision is made for removing this next commercial unit and replacing this next commercial unit with a pointer to a second file in which the next commercial is stored, step 56. On the other hand, if the commercial is the same, it is removed and replaced with a pointer to the first file wherein the first commercial is filed. Provision is made for playback of the recorded television program in which, when a pointer is reached, the commercial in the file pointed to is played back, step 57.

Figure 3:
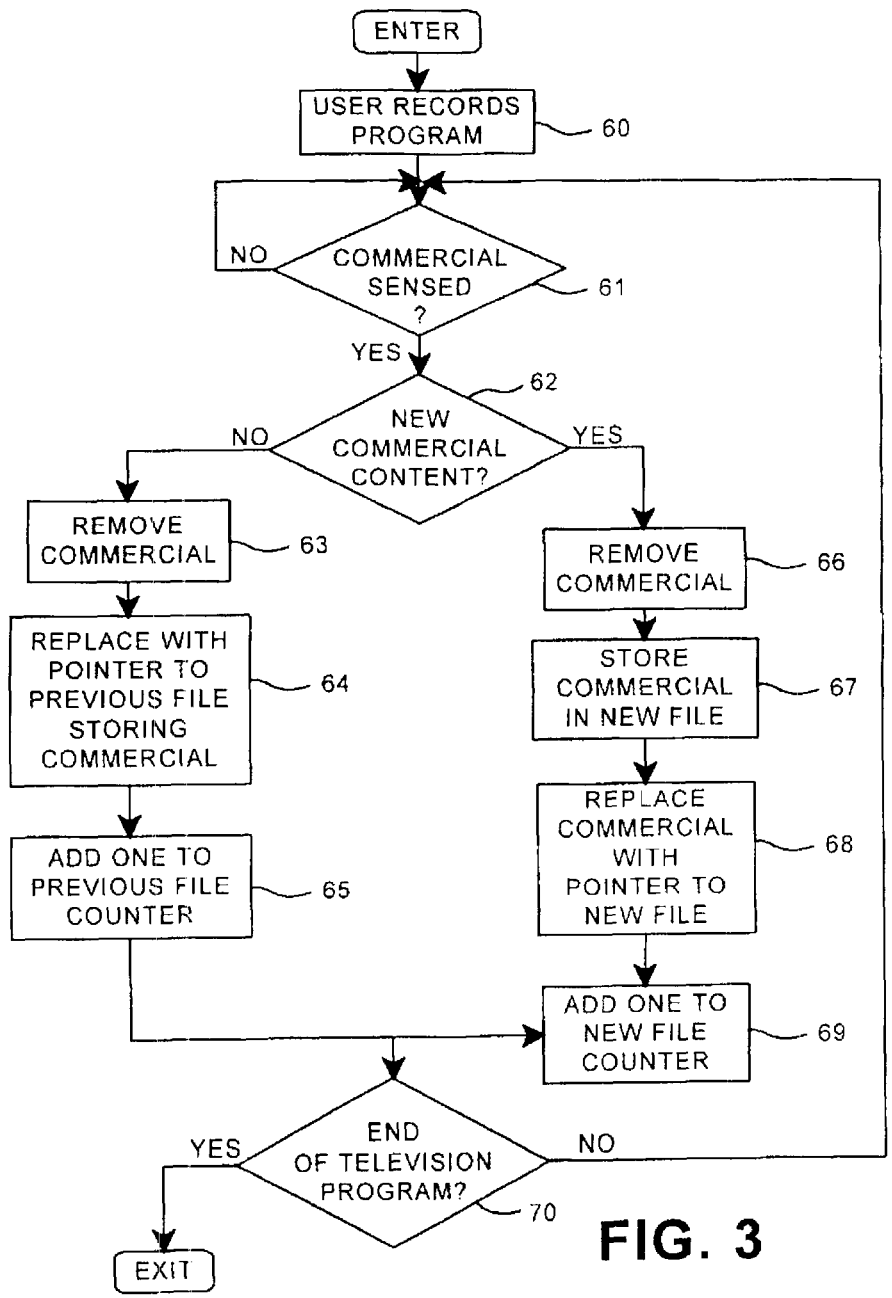
FIG. 3 is a flowchart of an illustrative run of a process set up in FIG. 2 in the recording of television programs on a DVR.

Now with respect to FIG. 3, an illustrative example of the process set up, as described in FIG. 2, will be described for recording a television program. As the recording of the selected television program starts, step 60, a determination is made as to whether a commercial unit is sensed, step 61. If Yes, a further determination is made, step 62, as to whether the commercial content is new. If Yes, the commercial unit is removed, step 66, and stored in a new file, step 67. The commercial in the television program stream is replaced by a pointer to the new file, step 68, and the new file counter is incremented by "1", step 69. On the other hand, if the determination is No, then the commercial unit is removed, step 63. The commercial in the television program stream is replaced by a pointer to the previous file in which the same previous file is stored, step 64, and the previous file counter is incremented by "1", step 65. After either step 65 or 69, a determination is made, step 70, as to whether the television program being recorded is at an end, step 70. If Yes, the process is exited. If No, the process is returned back to step 61.

Figure 4:
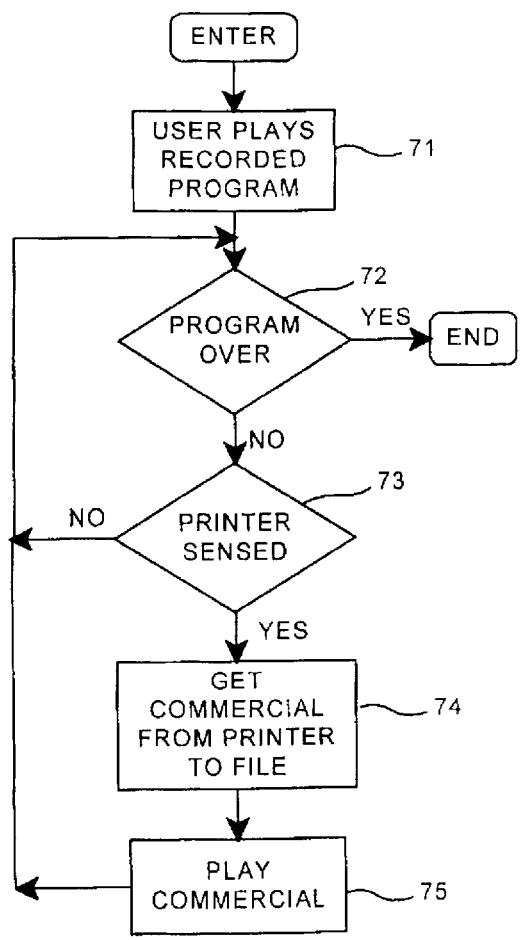
FIG. 4 is a flowchart of an illustrative run of a process set up in FIG. 2 in the playback television programs on a DVR.

Now with reference to FIG. 4, there will be described the playback of a television program recorded as previously described. As the viewer selects to playback, step 71, and the playback of the sequential television program is started, a determination is made, step 72, as to whether the recorded television program is over. If Yes, the process is exited. If No, a determination is made as to whether a pointer has been reached, step 73. If Yes, the commercial is retrieved from its file, step 74, and played, step 75. Then, or if the determination in step 73 is No, the process is returned to step 72.

Figure 5:
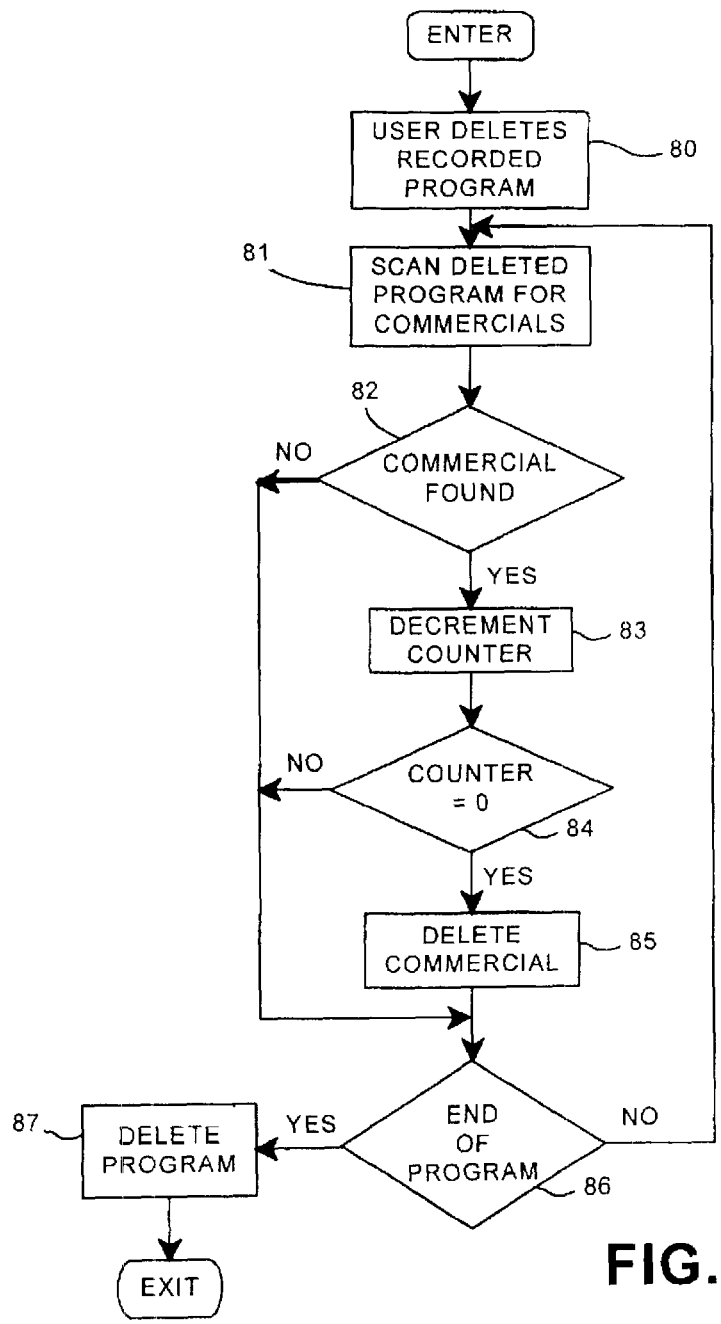
FIG. 5 is a flowchart showing when the television commercial content files are decremented when a recorded television program is chosen to be deleted.

Now with reference to FIG. 5, the viewer has completed his viewing of the recorded television program and has selected to delete it, step 80. The program being deleted is scanned for commercial pointers, step 81. If Yes, a commercial pointer is found, step 82, the file for recorded commercial content unit has its counter decremented by "1". A determination is made as to whether the counter for the commercial content equals "0", step 84. If Yes, there will be no further use for the specific commercial, the stored commercial content file is deleted, step 85. Then a determination is made, step 86, as to whether the recorded television program is at its end. If Yes, the television program is deleted, step 87.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. A method for recording viewer-selected broadcast television programs and for playing back such recorded television programs by a viewer comprising:
enabling a viewer to record at least one television program having periodic commercial content units;
sequentially sensing said at least one television program for a first commercial content unit;
removing said first commercial unit from said television program;
recording said first commercial unit in a separate first file;
replacing said removed first commercial unit in said recorded television with a pointer to said recorded first file;
sensing said television program for a next sequential commercial unit;
determining if said next commercial unit has the same content as said first commercial unit;
if said content is the same as the content of said first commercial unit, removing said next commercial unit from said television program, and replacing said removed unit with a pointer to said recorded first file;
if said content is not the same as the content of said first commercial unit, removing said next commercial unit from said television program, and recording said next commercial unit in a separate second file;
keeping a count of each time each of said stored commercial content files is pointed to during recording of the television program;
during the play back of the recorded television program, when a pointer is reached, playing the recorded commercial in the file pointed to;
decrementing said count of a stored commercial content file, each time each of said stored commercial content files is pointed to during the playback;
deleting said recorded television program after said playback; and
upon deletion of said recorded television program, also deleting each stored commercial content file having a count of zero.

2. The method of claim 1 wherein:
the viewer is enabled to record a plurality of television programs;
commercial content units in different television programs have the same content; and
pointers in said different television programs point to the same recorded commercial unit file.

3. The method of claim 2, wherein said television programs are being recorded on a digital video recorder (DVR).

4. A computer controlled system for recording viewer-selected broadcast television programs and for playing back such recorded television programs by a viewer comprising:
a processor; and
a computer memory holding computer program instructions which when executed by the processor perform the method comprising:
enabling a viewer to record at least one television program having periodic commercial content units;
sequentially sensing said at least one television program for a first commercial content unit;
removing said first commercial unit from said television program;
recording said first commercial unit, in a separate first file;
replacing said removed first commercial unit in said recorded television with a pointer to said recorded first file;
sensing said television program for a next sequential commercial unit;
determining if said next commercial unit has the same content as said first commercial unit;
if said content is the same as the content of said first commercial unit, removing said next commercial unit from said television program, and replacing said removed unit with a pointer to said recorded first file;
if said content is not the same as the content of said first commercial unit, removing said next commercial unit from said television program, and recording said next commercial unit in a separate second file;
keeping a count of each time each of said stored commercial content files is pointed to during recording of the television program;
during the play back of the recorded television program, when a pointer is reached, playing the recorded commercial in the file pointed to;
decrementing said count of a stored commercial content file, each time each of said stored commercial content files is pointed to during the playback;
deleting said recorded television, program after said playback; and
upon deletion of said recorded television program, also deleting each stored commercial content file having a count of zero.

5. The system of claim 4, wherein in the performed method:
the viewer is enabled to record a plurality of television programs;
commercial content units in different television programs have the same content; and
pointers in said different television programs point to the same recorded commercial unit file.

6. The system of claim 5 wherein said television programs are being recorded on a digital video recorder (DVR).

7. A non-transitory computer usable storage medium having stored thereon a computer readable program for recording viewer-selected broadcast television programs and for playing back such recorded television programs by a viewer, wherein the computer readable program when executed on a computer causes the computer to:
enable a viewer to record at least one television program having periodic commercial content units;
sequentially sense said at least one television program for a first commercial content unit;
remove said first commercial unit from said television program;
record said first commercial unit in a separate first file;
replace said removed first commercial unit in said recorded television with a pointer to said recorded first file;
sense said television program for a next sequential commercial unit;
determine if said next commercial unit has the same content as said first commercial unit;
if said content is the same as the content of said first commercial unit, remove said next commercial unit from said television program, and replace said removed unit with a pointer to said recorded first file;
if said content is not the same as the content of said first commercial unit, remove said next commercial unit from said television program, and record said next commercial unit in a separate second file;

keep a count of each time each of said stored commercial content files is pointed to during recording of the television program;

during the play back of the recorded television program, when a pointer is reached, play the recorded commercial in the file pointed to;

decrement said count of a stored commercial content file, each time each of said stored commercial content files is pointed to during the playback;

delete said recorded television program after said playback; and upon deletion of said recorded television program, also delete each stored commercial content file having a count of zero.

8. The non-transitory computer usable storage medium of claim 7, wherein said television programs are being recorded on a digital video recorder (DVR).

* * * * *